United States Patent Office 3,249,584
Patented May 3, 1966

3,249,584
POLYVINYLCHLORIDE STABILIZED WITH UREA AND BUTYL AMINO CROTONATE
Giovanni de Gasparis, Terni, Italy, assignor to Montecatini Societa Generale per l'Industria Mineraria e Chimica, a corporation of Italy
No Drawing. Filed Feb. 12, 1962, Ser. No. 172,754
Claims priority, application Italy, Feb. 15, 1961, 2,735/61
2 Claims. (Cl. 260—45.85)

The present invention relates to a method for the heat stabilization of chlorovinyl polymers, particularly polyvinyl chloride, and to the resulting stabilized compositions.

Heretofore it has been known to employ urea, thiourea, and alkyl- or aryl-substituted derivatives thereof as stabilizers for chlorovinyl polymers. It is also known that such polymers can be stabilized by the addition of aminocrotonic acid esters.

I have not surprisingly found that when a small amount of both a urea and an aminocrotonic acid ester are added to a chlorovinyl polymer, the resulting composition exhibits a heat stability which is considerably greater than that obtained from separately using (in equivalent percentages) either ureas or aminocrotonic acid esters.

I have found that there is a synergistic effect when both a urea and an aminocrotonic acid ester are used together as a stabilizer for chlorovinyl polymers.

Suitable ureas include urea, N,N-dimethylurea, thiourea, and the like. Suitable aminocrotonic acid esters include methyl aminocrotonate, ethyl aminocrotonate, isopropyl aminocrotonate, butyl aminocrotonate, octyl aminocrotonate, dodecyl aminocrotonate, and the like.

The amount of the stabilizing mixture of urea and aminocrotonic acid ester added to the polymeric composition should be from about 0.02 to 2% based on the total weight of the polymer plus stabilizing mixture. The preferred weight ratio of aminocrotonic acid ester to urea is 1:2.

Polyvinyl chloride obtained by the polymerization of a vinyl chloride emulsion is the chlorovinyl polymer wherein the method of our invention is preferably applied.

The stabilized compositions of our invention may also contain conventional additives such as plasticizers, lubricants, opacifiers, fillers, pigments, dyes and the like, which additives do not impair the stabilizing action of our crotonic acid ester/urea mixtures.

The stabilizers of my invention may be added to the finished polymer with agitation, or they may be added during the course of the polymerization. Alternatively, the stabilizers may be added to the polymer later, either before or during the removal of water therefrom.

In order to illustrate the superior stabilizing activity of my stabilizers as compared to the use of each one alone, comparative tests have been performed, the results of which are reported in the following tables:

TABLE I
*Thermal stability tests in an oven at 175° C.*

| Examples | 1 | | | 2 | | 3 | |
|---|---|---|---|---|---|---|---|
| | 1a | 1b | 1c | 2a | 2b | 3a | 3b |
| Polyvinyl chloride, percent | 64.7 | 65 | 64.5 | 63.4 | 65 | 64 | 65 |
| Dioctylphthalate, percent | 35 | 35 | 35 | 35 | 35 | 35 | 35 |
| Urea, percent | 0.2 | | | 1.5 | | | |
| N,N-dimethylurea, percent | | | | | | 0.5 | |
| Butyl aminocrotinate, percent | 0.1 | | 0.5 | | | 0.5 | |
| Octyl aminocrotonate, percent | | | | 0.1 | | | |
| Color change after: | | | | | | | |
| 15 min | none | marked | slight | none | marked | none | marked |
| 45 min | none | | marked | none | | none | |
| 60 min | none | | | none | | none | |

TABLE II
*Thermal stability tests in an oven at 180° C.*

| Color Change after— | Compositions | | | |
|---|---|---|---|---|
| | PVC¹, g. 50 DOP², g. 27 | PVC¹, g. 50 DOP², g. 27 BAC³, g. 0.15 | PVC¹, g. 50 DOP², g. 27 Urea, g. 0.15 | PVC¹, g. 50 DOP², g. 27 BAC³, g. 0.05 Urea, g. 0.10 |
| 5 min | Marked | Slight | Slight | None. |
| 10 min | Severe | do | do | Do. |
| 15 min | do | do | do | Do. |
| 20 min | do | do | do | Do. |
| 25 min | do | Marked | Marked | Do. |
| 30 min | Very strong | Severe | Severe | Slight. |

¹ PVC=polyvinyl chloride.
² DOP=dioctylphthalate.
³ BAC=butyl aminocrotonate.

Variations can of course be made without departing from the spirit of my invention.

Having thus described my invention, what I desire to secure and claim by Letters Patent is:

1. A heat stabilized composition comprising polyvinyl chloride and a mixture of urea and butyl amino crotonate, the amount of said mixture being from about 0.02 to 2% by weight based on the total weight of the polyvinyl chloride, urea, and butyl amino crotonate.

2. The composition of claim 1 wherein the weight ratio of urea to the crotonate is about 2:1.

(References on following page)

References Cited by the Examiner

UNITED STATES PATENTS

| | | | |
|---|---|---|---|
| 2,103,581 | 12/1937 | Gray | 260—45.9 |
| 2,313,757 | 3/1943 | Matheson et al. | 260—45.85 |
| 2,327,517 | 8/1943 | Frolich et al. | 260—45.85 |
| 2,555,167 | 5/1951 | Van Dijk et al. | 260—45.9 |
| 2,557,474 | 6/1951 | Sanderson | 260—45.85 |

FOREIGN PATENTS

| | | |
|---|---|---|
| 454,232 | 9/1936 | Great Britain. |
| 562,195 | 6/1944 | Great Britain. |
| 807,207 | 6/1951 | Germany. |
| 810,332 | 3/1959 | Great Britain. |

DONALD E. CZAJA, *Primary Examiner.*

LEON J. BERCOVITZ, *Examiner.*